United States Patent [19]

Cavanaugh et al.

[11] Patent Number: 5,237,049
[45] Date of Patent: Aug. 17, 1993

[54] PURIFICATION AND ADHESION OF FLUOROPOLYMERS

[75] Inventors: Robert J. Cavanaugh, Wilmington; William H. Tuminello, Newark, both of Del.

[73] Assignee: E. I. Du Pont de Nemours and Company, Wilmington, Del.

[21] Appl. No.: 936,446

[22] Filed: Aug. 28, 1992

[51] Int. Cl.$^5$ .......................... C08F 6/00; C09J 11/06; C09J 127/12
[52] U.S. Cl. .................................... 528/491; 528/481; 524/462; 524/545; 524/546; 156/83; 156/285; 156/326; 156/333; 427/207.1
[58] Field of Search ............................. 528/491, 481; 427/207.1, 208.4; 156/285, 333, 326, 327, 83; 524/462, 545, 546

[56] References Cited

FOREIGN PATENT DOCUMENTS

| | | |
|---|---|---|
| 0472908A2 | 7/1991 | European Pat. Off. |
| 46-04657 | 2/1971 | Japan .................................. 528/491 |
| 1-149812 | 6/1989 | Japan .................................. 528/491 |

OTHER PUBLICATIONS

Hackh's Chemical Dictionary, J. Grant (ed.), McGraw-Hill, Inc., N.Y., 1969, p. 199.

*Primary Examiner*—Fred Teskin

[57] ABSTRACT

A process for purifying fluoropolymers by contacting them at temperatures above 140° C. with a liquid perfluorinated cycloalkane. The resulting polymers are particularly useful where polymers with reduced impurities are desirable, such as in medical devices and in parts for the semiconductor manufacturing industry. The liquid perfluorinated cycloalkanes improve the adhesion of fluoropolymer to themselves and other materials.

30 Claims, No Drawings

PURIFICATION AND ADHESION OF FLUOROPOLYMERS

FIELD OF THE INVENTION

Fluoropolymers with melting points above about 200° C. are purified by extraction with a perfluorinated cycloalkane whose boiling point at atmospheric pressure is about 140° C. or more. A method of adhering fluoropolymers to surfaces is also disclosed.

TECHNICAL BACKGROUND

It is well known that most polymers contain "impurities", materials that are different from the higher molecular polymer that constitutes the main part of the polymer. These impurities are often low molecular polymer (oligomer) and other impurities used or made in the polymerization process, such as initiator fragments or surfactants. For many polymers, particularly those not containing fluorine, purification can be accomplished by extracting the polymer with a "solvent" which swells the polymer somewhat, and also dissolves the impurities.

Fluorocarbon polymers, particularly perfluorocarbon polymers that have relatively high melting points are not usually purified by extraction, since solvents that swell the polymers and can dissolve oligomers and other impurities are limited.

European Patent Application 472,908 describes such an extraction using fluorine containing solvents. However, all of the solvents used or mentioned in this patent have boiling points below 100° C. In order to reach even moderately warm (80°-100° C.) temperatures the use of a pressure vessel is required. Even then only very small amounts of impurities are extracted.

In the instant invention use of perfluorinated cycloalkanes (PFC) with atmospheric boiling points above about 140° C. allows the extraction to be run without a pressure vessel, and the extraction is faster and more "impurities" can be extracted. The purified polymer can be used in medical devices and in parts for semiconductor manufacturing industry, in both of which uses impurities can be very deleterious.

SUMMARY OF THE INVENTION

This invention concerns a process for the purification of fluoropolymers, comprising, contacting, at an extraction temperature of about 140° C. or more, a fluoropolymer with a liquid perfluorinated cycloalkane, provided that:

said fluoropolymer has a melting point of about 200° C. or more;

said extraction temperature is below said melting point; and said perfluorinated cycloalkane has a boiling point of about 140° C. or more at atmospheric pressure.

This invention also concerns a process for adhering a fluoropolymer surface to another surface, comprising, coating a fluoropolymer surface with a perfluorinated cycloalkane or a solution of a fluoropolymer in a perfluorinated cycloalkane to make a coated fluoropolymer surface, contacting said coated fluoropolymer surface with another surface, and then applying pressure to force said coated fluoropolymer surface and said another surface together, to adhere said fluoropolymer surface to said another surface, provided that:

the process is carried out at a temperature below the perfluorinated cycloalkane's atmospheric pressure boiling point;

said perfluorinated cycloalkane has a boiling point of about 140° C. or more at atmospheric pressure; and said fluoropolymer has a melting point of about 200° C. or more.

DETAILS OF THE INVENTION

By a fluoropolymer herein is meant a polymer that contains at least about 35% by weight of fluorine, preferably at least about 50% by weight of fluorine. In one preferred embodiment, the fluoropolymer is a perfluoropolymer, that is contains essentially no hydrogen or other (than fluorine) halogen in the polymer. In another preferred embodiment the polymer is a homopolymer or copolymer of tetrafluoroethylene (TFE). Such copolymers include, but are not limited to, TFE copolymers with ethylene, $CF_2=CFO(CF_2)_mCF_3$, $CH_2=CH(CF_2)_mCF_3$, and $CF_2=CF(CF_2)_mCF_3$ where m is 0 to 17. In preferred TFE copolymers, the comonomer is ethylene, perfluoro(propyl vinyl ether), perfluoro(methyl vinyl ether) and hexafluoropropene. Polymers containing TFE units, particularly the homopolymer and copolymers containing relatively high proportions of TFE, tend to have high melting points, and these high melting points, combined with the relative chemical inertness of these polymers makes them difficult to purify.

The fluoropolymer should have a melting point (Tm) of about 200° C. or more, preferably about 250° C. or more. In a preferred embodiment the Tm of the fluoropolymer is about 250° C. The fluoropolymer Tm should preferably not be above 400° C. It is preferred if the extraction temperature is at least 40° C. below the Tm.

By a perfluorinated cycloalkane herein is meant a saturated cyclic compound, which may contain fused or unfused rings, and which is perfluorinated. In addition, the perfluorinated cycloalkane may be substituted by perfluoroalkyl and perfluoroalkylene groups. By perfluoroalkyl group is meant a saturated branched or linear carbon chain. By perfluoroalkylene group is meant an alkylene group which is branched or linear and is bound to two different carbon atoms in carbocyclic rings. The total number of carbon atoms in all of the perfluoroalkyl and perfluoroalkylene groups in a molecule of the perfluorinated cycloalkane must be less than the total number of carbon atoms in the carbocyclic rings of a solvent molecule. It is preferred if there are at least twice as many carbon atoms in the rings of the perfluorinated cycloalkane as there are atoms in the perfluoroalkyl and perfluoroalkylene groups. Useful perfluorocycloalkanes include, but are not limited to (atmospheric boiling points from the literature in degrees C. in parentheses); perfluorotetradecahydrophenanthrene (215), perfluoro[(methylcyclohexyl)decahydronaphthalene] (250-260), "dimer" (see below), perfluorodecahydronaphthalene (141), perfluoro(1-methyldecahydronaphthalene) (159) perfluoro(dimethyldecahydronaphthalene) (180). These compounds can be made by fluorination of the corresponding hydrocarbon compound, see for example British Patent 1,281,822.

By "dimer" herein is meant a byproduct from the fluorination of phenanthrene using a combination of $CoF_3$ and fluorine, as described in British Patent 1,281,822. When phenanthrene is thus fluorinated to perfluorotetradecahydrophenanthrene, a higher boiling fraction is obtained upon fractional distillation of the crude liquid product. This fraction has a boiling point in the range of 280° C. to about 400° C. at atmospheric pressure, typically about 320°-340° C. It has a small amount of olefin and a very small amount of hydrogen in it which can be further reduced by postfluorination. It is believed that most of this mixture consists of the general structure

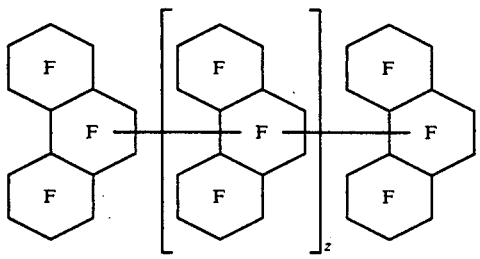

wherein z is 0, 1 or 2. Also believed to be present in smaller quantities are compounds from ring fusion and/or ring opening of the above compounds or their precursors such as

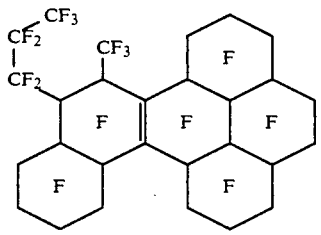

from the compound where z is 0 (it is not possible to say with assurance that this particular isomer is in the mixture—it is merely illustrative of one possible structure consistent with the analytical data and the synthetic method). Similar fused structures from the compounds where z is 1 or 2 are also believed to be present. Although traces of hydrogen are present, the location has not been determined.

Purification of the fluoropolymer is carried out by contacting it with perfluorinated cycloalkane (PFC). This type of process is often referred to as an extraction. It is preferred that the extraction or purification process removes at least 0.1%, preferably about 0.25% by weight, of the original sample, of low molecular weight polymer and/or other impurities. The extraction may be carried out by contacting the polymer with the liquid PFC. at a temperature above about 140° C. Control of the temperature is facilitated if the PFC. is chosen so that its boiling point is the desired extraction temperature; the PFC. may simply be refluxed. After the extraction is completed, the fluoropolymer is separated from the PFC. by decantation or filtration. A more efficient method of extraction is to continuously extract with "fresh" PFC, as is commonly done using the well known Soxhlet type of extraction apparatus or its industrial equivalent. In this apparatus fresh PFC. is constantly refluxed, with the condensate passing through the solid material that is being extracted, and then returned to the vessel which contains the refluxing PFC. Other methods are known to the art skilled. All of these are especially easy to carry out with the claimed PFCs because the process can be conducted at atmospheric pressure. In all of these extractions, the more finely divided the fluoropolymer is, the faster the extraction proceeds. Pellets that are typically used in molding fluoropolymers are a convenient form to use.

The choice of what PFC. to use with a particular polymer depends on several factors. The first of these is the Tm of the fluoropolymer. The temperature at which the extraction is done should be below Tm, as appropriate, so as not to dissolve the majority of the fluoropolymer. It is preferred if less than 10% by weight of the original polymer is extracted into the liquid. Assuming the extraction is to be done at atmospheric pressure and the boiling point of the PFC, this means choosing a PFC. with an appropriate boiling point. As the extraction temperature increases, the more material will be extracted from the fluoropolymer, and the faster the extraction will be. The increased amounts of material extracted tend to be higher and higher molecular weight oligomers (polymer molecules) as the extraction temperature increases. As this occurs however, as the extraction temperature approaches Tm, the fluoropolymer will also have a greater tendency to swell, deform, and for the pieces to stick together. Thus, a small amount of experimentation may be necessary with any particular polymer by trying a few PFCs, to achieve the correct balance of amount of material extracted, extraction speed, and deformation of the fluoropolymer. This is easily done on a laboratory scale in a Soxhlet extractor.

The perfluorinated cycloalkanes described herein may also be used as "adhesion promoters" for adhering the polymers described herein to various substances, and preferably other fluoropolymers, and more preferably themselves. The perfluorinated cycloalkane can be used alone, or in the form of a fluoropolymer solution, preferably containing the same fluoropolymer that is being adhered to another surface. The preparation of such solutions is described in commonly assigned U.S. patent application Ser. No. 936,449, filed concurrently with this application. A preferred concentration for the fluoropolymer in the perfluorinated cycloalkane solution is about 0.01 to about 20 percent by weight of the total solution weight, more preferably about 1% to about 10%.

A perfluorinated cycloalkane or a solution of a fluoropolymer in a perfluorinated cycloalkane is coated (the thickness of the coating is not critical, but the entire surface to be adhered should preferably have at least some of the PFC. on it) onto the fluoropolymer surface to be joined (or optionally both surfaces if both are fluoropolymers), and then the fluoropolymer surface is contacted with the surface to which it is to be adhered. The fluoropolymer may be coated by known methods, such as brushing on, spraying, roller coating, etc. To assist the coating process, the PFC. (or PFC solution) may be diluted with a relatively (compared to the PFC) volatile solvent. The coated fluoropolymer surface is then contacted with the surface to which it is to be adhered to, and pressure is then applied. A convenient pressure range is about 70 kPa to about 35 MPa. Heat may also be applied. A useful temperature range is ambient to about the melting point of the polymer, preferably about 100° C. below Tm to about Tm.

Useful and preferred polymers and solvents for this process are as listed above. Since the solvent is to be coated onto the fluoropolymer pieces and should remain there at least for the first part of the bonding process, it is preferred if relatively higher boiling (at atmospheric pressure) solvents are used, and dimer is a preferred solvent. The bonding process should not be carried out at or above the atmospheric pressure boiling point of the perfluorinated cycloalkane.

It is believed that the extraction and adhesion processes are particularly fast and efficient with the PFCs because they have relatively high boiling points allowing extraction at higher temperatures, and because they more readily swell the fluoropolymers used herein than many other PFCs. The PFCs used herein are known to rapidly dissolve fluoropolymers, as described in commonly assigned U.S. patent application Ser. No. 936,449, filed concurrently with this application, and it is hereby included by reference.

In Examples 1-6, the fluoropolymer used was a copolymer of TFE and perfluoro(propyl vinyl ether) containing about 1.4 mole percent perfluoro(propyl vinyl ether). It had a melting point (peak, as measured by DSC) of 305° C. and a zero shear viscosity of 5,500 Pa.s at 380° C. The fluoropolymer was in the form of pellets suitable for molding. All glassware and sample holders were "extracted" (cleaned) with the same PFC used before adding the polymer. Final weights of the extracted polymer and of the residue extracted were obtained by drying the polymer or extract at about 180° C. in a vacuum oven until constant weights were obtained. All extractions were done in a micro Soxhlet extractor having a 25 mL reservoir and refluxing flask. The sample holders had fritted glass bottoms.

EXAMPLE 1

Approximately 1.68-1.69 g of fluoropolymer was placed in the sample holder and 20 mL of perfluorotetradecahydrophenanthrene (from PCR, Inc. Gainesville, FL), boiling point 215° C., was added to the flask. The fluoropolymer was extracted for 65.5 hr by placing the flask in a molten salt bath at 250° C., thus refluxing the perfluorotetradecahydrophenanthrene. At the end of this time the polymer was isolated and dried, and had a weight loss of 18.9 mg (1.12% of original fluoropolymer weight). The solvent was evaporated and left a residue of 17.4 mg (1.03%). Two more identical runs had polymer weight losses of 1.15% and 1.17% and had residues of 1.05% and 1.06%.

EXAMPLES 2-5

The same procedure was used as in Example 1, except the extraction times were varied. The results are shown below.

| Example | Extraction Time (hr) | Weight Loss (%) | Residue (%) |
|---------|---------------------|-----------------|-------------|
| 2 | 5 | 0.54 | 0.48 |
| 3 | 24 | 0.88 | 0.83 |
| 4 | 48 | 1.11 | 1.01 |
| 5 | ~172 | 1.26 | 1.27 |

EXAMPLE 6

A sample of perfluoro[(methylcyclohexyl)decahydronaphthalene] (from 3M Co., St. Paul, Minn., as Fluorinert ® FC-71) was purified by refluxing for 24 hr. at atmospheric pressure and then distilling at 6650 Pa pressure. The fraction distilling at 154°-162° C. was used.

The apparatus was the same as described in Example 1. To the sample holder was added 0.5663 g of fluoropolymer, and then 20 mL of purified perfluoro[(methylcyclohexyl)decahydronaphthalene] boiling point about 255° C., was added to the flask. The temperature of the salt bath was gradually raised, and when the salt bath reached 288° C. a rapid but controlled reflux ensued. The extraction was continued for 24 hr. At the end of this time the polymer was quite swollen and the pieces fused together. The polymer lost 6.30% of its weight, and the residue extracted was 6.18% of the original fluoropolymer weight.

The results of this extraction can be quite varied. Since the polymer swells so much care must be taken not to lose swollen polymer from the sample holder, and the reflux rate must be carefully controlled. This particular purification was well controlled. The Example illustrates the effects of using a perfluorinated cycloalkane at a temperature relatively close to the melting point of the polymer.

EXAMPLES 7-10

The polymers used in each of these Examples are:

Example 7—A copolymer of about 11 weight percent of hexafluoropropene and about 89 weight percent TFE, and melts at about 260° C.

Example 8—The same polymer as used in Examples 1-6.

Example 9—A modified alternating copolymer of ethylene and TFE melting at about 275° C.

Example 10—A homopolymer of TFE melting at about 330° C.

In each of these examples four pieces of 15.4×15.4 cm square by 0.25 mm thick film (except for Example 10 which used 0.125 mm thick skived tape) were prepared and placed onto pieces of 0.125 mm thick aluminum foil which had been coated with Frekote ® 33, a mold release sold by Frekote, Seabrook, N.H. A solution of 32 weight percent dimer in 1,1,2-trichloro-1,2,2-trifluoroethane (113) was "painted" onto two of the pieces over an area of about 15.4×11.4 cm. The 113 was evaporated leaving a total of about 0.6 g of dimer on the two films. Together with their backing pieces of aluminum foil, the two coated surfaces were contacted with each other, placed in a heated press, and the press was closed so that the platens just maintained contact with the pieces of aluminum foil for 2 min. Then pressure was applied and held for 3 min. The pressure was then released and the sample removed and allowed to cool.

The two pieces of uncoated film for each example were treated the same way and used as controls. Samples of the adhered portions 2.54 cm wide were then cut, and the peel strength measured by ASTM method D1876-72, except the strip length used was different (see above), and the jaws were separated at a rate of 30.5 cm/min. The pressures and temperatures used, and the peel strengths obtained are listed below.

| Example | Temp., °C. | Pressure, kPa | Peel Strength, g/cm | |
|---------|------------|---------------|---------------------|---|
| | | | With Dimer | Without Dimer |
| 7 | 249 | 957 | 1453 | —[a] |
| 8 | 299 | 765 | 1859[b] | 155 |
| 9 | 232 | 765 | 2399 | 115 |
| 10 | 231 | 765 | 948 | 109 |

[a]Films fell apart.
[b]Only one measurement. Tab tore on others

EXAMPLE 11

Thirty grams of the copolymer of Example 7 was dissolved in 300 grams of dimer by adding the polymer slowly with stirring over a two hour period with the solution maintained at a temperature of about 305° C.

Two pieces of the copolymer of Example 7, 0.25 mm thick were cut 8.5 cm square. The solution was cooled to about 280° C. and a small amount of the solution removed with a spatula and coated on one side of one piece of the film. The second piece of film was placed on top, in contact with the solution. The resulting sandwich was placed between two sheets of aluminum and put in a hydraulic press maintained at a temperature of 160° C. The press was closed to maintain contact with no pressure and held for 3 minutes. A force of 4530 kg was then applied for 10 minutes. The sample was cooled under pressure until a press platen temperature of 50° C. The press was then opened and the sample removed. The two sheets of copolymer were well adhered. All attempts to measure peel strength resulted in failure of the film.

EXAMPLE 12

Fluoropolymer film (as in Example 10) 0.25 mm thick was used. Aluminum plates 10.3×20.3 cm by 0.64 mm thick, and having a surface roughness of 0.38-0.64 micrometers were used. Pieces of the fluoropolymer film were cut to the same size as the aluminum plates. One piece of fluoropolymer film and one aluminum plate were brush coated with a 32 weight percent solution of dimer in 113. The 113 was allowed to evaporate, and then the coated surfaces of the fluoropolymer and aluminum sheets were contacted together. A piece of aluminum foil was placed over the fluoropolymer and the assembly was placed in a press which was heated to 243° C. The platens were closed until just contacting the upper and lower surfaces of the assembly for 2 min. Then pressure (0.86 MPa) was applied for 4 min., and then the assembly was removed from the press.

A control experiment was done in the same way, except no dimer was applied. After removal from the press there was no adhesion in the control between the fluoropolymer and the aluminum. The laminate in which dimer was used had good adhesion between the fluoropolymer and aluminum.

What is claimed is:

1. A process for the purification of fluoropolymers, comprising, contacting, at an extraction temperature of about 140° C. or more, a fluoropolymer with a liquid perfluorinated cycloalkane, provided that:
    said fluoropolymer has a melting point of about 200° C. or more;
    said extraction temperature is below said melting point; and
    said perfluorinated cycloalkane has a boiling point of about 140° C. or more at atmospheric pressure.

2. The process as recited in claim 1 wherein said melting point is about 250° C. or more.

3. The process as recited in claim 1 wherein said extraction temperature is about 200° C. or more.

4. The process of claim 1 carried out at atmospheric pressure.

5. The process as recited in claim 3 wherein said melting point is 250° C. or more.

6. The process as recited in claim 1 wherein said fluoropolymer has at least 50% by weight of fluorine.

7. The process as recited in claim 1 wherein said fluoropolymer is a perfluoropolymer.

8. The process as recited in claim 1 wherein said fluoropolymer is a homopolymer or copolymer of tetrafluoroethylene.

9. The process as recited in claim 8 wherein a comonomer in said copolymer is ethylene, $CF_2=CFO(CF_2)_mCF_3$, $CH_2=CH(CF_2)_mCF_3$ or $CF_2=CF(CF_2)_mCF_3$ where m is 0 to 17.

10. The process as recited in claim 1 wherein said perfluorinated cycloalkane is selected from the group consisting of perfluorotetradecahydrophenanthrene, perfluoro[(methylcyclohexyl)decahydronaphthalene], dimer, perfluorodecahydronaphthalene, perfluoro(1-methyldecahydronaphthalene), and perfluoro(dimethyldecahydronaphthalene).

11. The process as recited in claim 9 wherein said perfluorinated cycloalkane is selected from the group consisting of perfluorotetradecahydrophenanthrene, perfluoro[(methylcyclohexyl)decahydronaphthalene], dimer, perfluorodecahydronaphthalene, perfluoro(1-methylcyclohexyl)decahydronaphthalene), and perfluoro(dimethyldecahydronaphthalene).

12. The process of claim 11 carried out at atmospheric pressure.

13. The process as recited in claim 1 wherein said extraction temperature is at least 40° C. lower than said melting point.

14. The process as recited in claim 10 wherein said extraction temperature is at least 40° C. lower than said melting point.

15. The process as recited in claim 11 wherein said extraction temperature is at least 40° C. lower than said melting point.

16. A process for adhering a fluoropolymer surface to another surface, comprising, coating a fluoropolymer surface with a perfluorinated cycloalkane or a solution of a fluoropolymer in a perfluorinated cycloalkane to make a coated fluoropolymer surface, contacting said coated fluoropolymer surface with another surface, and then applying pressure to force said coated fluoropolymer surface and said another surface together, to adhere said fluoropolymer surface to said another surface, provided that:
    the process is carried out at a temperature below the perfluorinated cycloalkane's atmospheric pressure boiling point;
    said perfluorinated cycloalkane has a boiling point of about 140° C. or more at atmospheric pressure; and
    said fluoropolymer has a melting point of about 200° C. or more.

17. The process as recited in claim 16 wherein said melting point is about 250° C. or more.

18. The process as recited in claim 16 wherein said temperature is about ambient to about the melting point of said fluoropolymer.

19. The process as recited in claim 16 wherein said fluoropolymer has at least 50% by weight of fluorine.

20. The process as recited in claim 16 wherein said fluoropolymer is a perfluoropolymer.

21. The process as recited in claim 16 wherein said polymer is a homopolymer or copolymer of tetrafluoroethylene.

22. The process as recited in claim 21 wherein a comonomer in said copolymer is ethylene, $CF_2=CFO(CF_2)_mCF_3$, $CH_2=CH(CF_2)_mCF_3$ or $CF_2=CF(CF_2)_mCF_3$ where m is 0 to 17.

23. The process as recited in claim 16 wherein said perfluorinated cycloalkane is selected from the group consisting of perfluorotetradecahydrophenanthrene, perfluoro[(methylcyclohexyl)decahydronaphthalene], dimer, perfluorodecahydronaphthalene, perfluoro(1- methyldecahydronaphthalene), and perfluoro(dimethyldecahydronaphthalene).

24. The process as recited in claim 23 wherein said perfluorinated cycloalkane is dimer.

25. The process as recited in claim 16 wherein said pressure is about 70 kPa to about 35 MPa.

26. The process as recited in claim 21 wherein said perfluorinated cycloalkane is selected from the group consisting of perfluorotetradecahydrophenanthrene, perfluoro[(methylcyclohexyl)decahydronaphthalene], dimer, perfluorodecahydronaphthalene, perfluoro(1-methyldecahydronaphthalene), and perfluoro(dimethyldecahydronaphthalene).

27. The process as recited in claim 16 wherein said another surface is a fluoropolymer surface.

28. The process as recited in claim 16 wherein said perfluorinated cycloalkane is used.

29. The process as recited in claim 16 wherein said solution of a fluoropolymer in a perfluorinated cycloalkane is used.

30. The process as recited in claim 16 wherein said temperature is about 100° C. below the melting point of said polymer to about the melting point of said polymer.

* * * * *